C. Van Horn.
Pier.

Nº 2,611.
33,615.

Patented Oct. 29, 1861.

Witnesses:
J.W. Combs
J.G.W. Reade

Inventor:
Chester Van Horn
per Munn & Co.
Attorneys

UNITED STATES PATENT OFFICE.

CHESTER VAN HORN, OF SPRINGFIELD, MASSACHUSETTS.

IMPROVEMENT IN MODES OF LOWERING PIERS INTO THE WATER.

Specification forming part of Letters Patent No. 33,615, dated October 29, 1861.

*To all whom it may concern:*

Be it known that I, CHESTER VAN HORN, of Springfield, in the county of Hampden and State of Massachusetts, have invented a new and useful Improvement in Mechanism for Lowering Piers into the Water During the Process of Building or Construction; and I do hereby declare that the following is a full, clear, and exact description of the same, reference being had to the annexed drawings, making part of this specification, in which—

Figure 1:
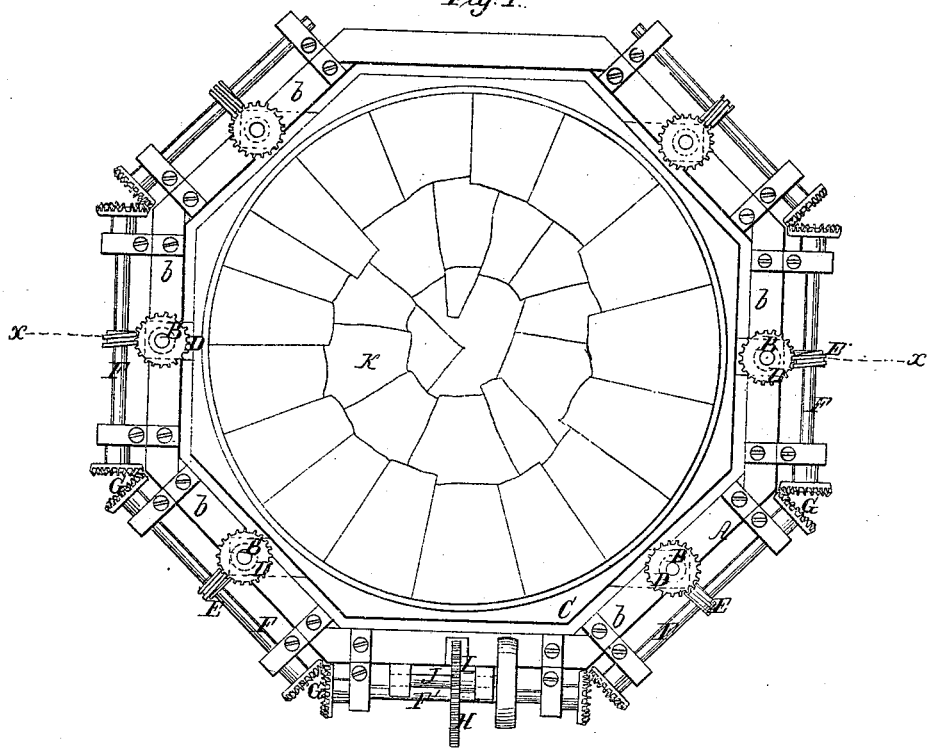
Figure 2:
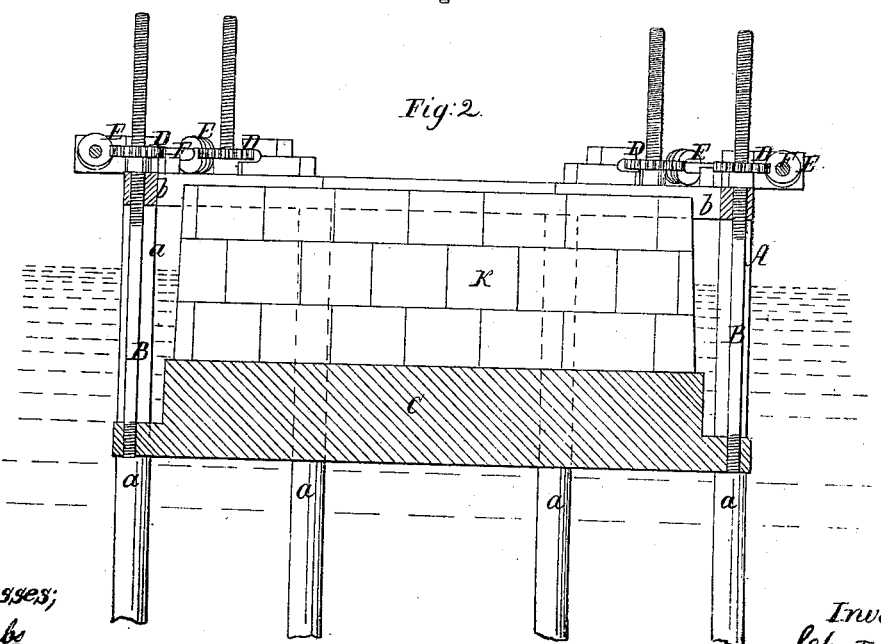

Figure 1 is a plan or top view of my invention; and Fig. 2, a side sectional view of the same, taken in the line $x\ x$ of Fig. 2.

Similar letters of reference indicate corresponding parts in the two figures.

In building piers of masonry for bridges and other structures over water the piers are in many cases built on platforms which are lowered into the water from time to time as the work progresses until the platforms rest on the bottom. The platforms now used for such purpose are supported by screw-rods from a suitable framing and the nuts of the rods turned independently and separately by operatives when the platforms are to be lowered. The difficulty attending this arrangement is the expense and tediousness of the operation of lowering, and also the care required in keeping the platforms level or horizontal, as the rods require to be lowered precisely alike.

The object of the within-described invention is to overcome these difficulties; and to this end I connect the nuts of the several screw-rods by mechanism so arranged that all the nuts will be operated simultaneously from one and the same driving-shaft, and consequently not only much labor saved in lowering the platforms but the horizontality of the same always preserved.

To enable those skilled in the art to fully understand and construct my invention, I will proceed to describe it.

A represents a framing, which is composed of piles $a$, driven into the bottom of the stream and encompassing the spot where the pier is to be built and sunk. The upper ends of the piles are connected by timbers $b$, through which screw-rods B pass, the lower ends of said rods being attached to a platform C. Each screw-rod B has a nut D upon it, said nuts resting on the upper surfaces of the timbers $b$. The platform C, it will be seen, is suspended from the timbers $b$ by the screw-rods B. This is shown clearly in Fig. 2. The nuts D are of circular form and toothed, forming gears, as shown clearly in Fig. 1, and into each nut D a worm-wheel E gears. The worm-wheels E are each on a shaft F, the bearings of which are attached to the timbers $b$, and the several shafts F are connected by gears G, as shown clearly in Fig. 1. There is a shaft F', which is connected with the shafts F and has a toothed wheel H upon it, into which a pinion I on a driving-shaft J gears. The shaft F' is placed about midway among the shafts F, and through the medium of the gearing H I communicates power to them from shaft J.

From the above description it will be seen that by turning shaft J all the shafts F will be turned simultaneously, and consequently the platform C will be lowered horizontally and by a single application of power, the arrangement admitting of the employment or use of steam or other power. The workmen build the pier on the platform C and lower it into the water from time to time as the work progresses until the platform and pier touch the bottom of the river or stream. The invention, it will be seen, dispenses with much labor and greatly facilitates the operation of lowering the pier.

I do not confine myself to the precise arrangement herein shown and described for connecting the several shafts F, for that may be varied or modified in various ways and the same result attained.

I do not claim, broadly, the lowering of piers into the water during the course of their construction by building the same on adjustable suspended platforms; but I do claim as new and desire to secure by Letters Patent—

The connecting of the several nuts D of the screw-rods B to a common driving-shaft J, substantially as shown or in an equivalent way, when said screw-rods and nuts are employed to sustain a platform C for the purpose of lowering piers into the water during the course of construction.

CHESTER VAN HORN.

Witnesses:
WM. WHITNEY,
JASPER MERCER.